(12) United States Patent
Abu Al-Rubb

(10) Patent No.: US 9,494,923 B2
(45) Date of Patent: Nov. 15, 2016

(54) ELECTRO-MECHANICAL INTERFACE

(76) Inventor: Khalil Abu Al-Rubb, Doha (QA)

( * ) Notice: Subject to any disclaimer, the term of this patent is extended or adjusted under 35 U.S.C. 154(b) by 661 days.

(21) Appl. No.: 13/823,389

(22) PCT Filed: Aug. 22, 2011

(86) PCT No.: PCT/GB2011/001259
§ 371 (c)(1),
(2), (4) Date: May 24, 2013

(87) PCT Pub. No.: WO2012/035286
PCT Pub. Date: Mar. 22, 2012

(65) Prior Publication Data
US 2013/0234537 A1 Sep. 12, 2013

(30) Foreign Application Priority Data
Sep. 14, 2010 (GB) .................... 1015266.8

(51) Int. Cl.
*G05B 11/00* (2006.01)
*G01D 11/02* (2006.01)
*G01D 11/16* (2006.01)

(52) U.S. Cl.
CPC .............. *G05B 11/00* (2013.01); *G01D 11/02* (2013.01); *G01D 11/16* (2013.01)

(58) Field of Classification Search
CPC ............................... G01D 11/02; G01D 11/16
USPC ................................................. 307/650, 151
See application file for complete search history.

(56) References Cited

U.S. PATENT DOCUMENTS

| | | | |
|---|---|---|---|
| 4,091,234 A | 5/1978 | Bristow | |
| 4,342,279 A | 8/1982 | Seko et al. | |
| 4,498,350 A * | 2/1985 | Ross | F16H 63/304 192/109 A |
| 5,276,722 A | 1/1994 | Aoki et al. | |
| 5,302,886 A | 4/1994 | Jacobsen et al. | |
| 5,573,088 A * | 11/1996 | Daniels | B60G 17/0157 188/267 |
| 2010/0116572 A1* | 5/2010 | Schmitt | B60G 3/28 180/65.51 |

FOREIGN PATENT DOCUMENTS

| | | |
|---|---|---|
| EP | 1 582 141 A1 | 10/2005 |
| JP | S59-109461 A | 6/1984 |

(Continued)

OTHER PUBLICATIONS

U.K. Search Report dated Jan. 19, 2011 for GB Application No. 1015266.8 consisting of 3-pages.

(Continued)

*Primary Examiner* — Rexford Barnie
*Assistant Examiner* — Terrence Willoughby
(74) *Attorney, Agent, or Firm* — Christopher & Weisberg, P.A.

(57) ABSTRACT

An embodiment of the invention extends to an interface for converting rotational motion to electrical signals comprising a mechanical actuator which is rotationally moveable in a first direction and in a second direction, and a first and a second electrical component connected to the actuator and arranged so that rotation of the actuator in the first direction causes changes in electrical properties of the first electrical component and rotation of the actuator in the second direction causes changes in electrical properties of the second electrical component. The first and the second electrical components are connected to one or more electrical circuits so that rotation of the actuator in the first and the second directions causes changes in the one or more electrical circuits.

11 Claims, 3 Drawing Sheets

(56) References Cited

FOREIGN PATENT DOCUMENTS

| | | |
|---|---|---|
| JP | H04-274969 A | 9/1992 |
| JP | 2000-289636 A | 10/2000 |
| JP | 2001-201370 A | 7/2001 |
| JP | 2007-223508 A | 9/2007 |
| JP | 2007-269047 A | 10/2007 |
| JP | 2008-280004 A | 11/2008 |
| JP | 2009-213251 A | 9/2009 |
| RU | 2388631 C2 | 9/2009 |
| SU | 1337306 A1 | 9/1987 |
| SU | 1339452 A1 | 9/1987 |

OTHER PUBLICATIONS

International Search Report and Written Opinion dated Feb. 22, 2013 for International Application No. PCT/GB2011/001259, International Filing Date: Aug. 22, 2001 consisting of 12-pages.

Office Action for Australian Patent Application No. 2011303718, dated Oct. 23, 2013, consisting of 4-pages.

Japanese Office Action in both Japanese and its English translation dated Oct. 20, 2015 for corresponding Japanese National Stage Application Serial No. 2013-528755, consisting of 21 pages.

Russian Official Action in both Russian and its English translation dated Aug. 10, 2015 for corresponding Russian National Stage Application Serial No. 2013115001, Russian National Stage Entry Date: Aug. 22, 2011, consisting of 32 pages.

Russian Official Action in both Russian and its English translation dated Dec. 17, 2015 for corresponding Russian National Stage Application Serial No. 2013115001/28(022204), Russian National Stage Entry Date: Aug. 22, 2011, consisting of 20 pages.

\* cited by examiner

ELECTRO-MECHANICAL INTERFACE

CROSS-REFERENCE TO RELATED APPLICATIONS

This application is a Submission Under 35 U.S.C. §371 for U.S. National Stage Patent Application of International Application Number: PCT/GB2011/001259, filed Aug. 22, 2011 entitled "ELECTRO-MECHANICAL INTERFACE," which claims priority to Great Britain Patent Application Serial No: 1015266.8, filed Sep. 14, 2010, the entirety of both which are incorporated herein by reference.

FIELD OF EMBODIMENTS OF THE INVENTION

Embodiments of the invention relate to providing an interface between an electrical system and a mechanical system. Certain embodiments of the invention relate to providing an interface between a mechanically operated steering control and an electrical control mechanism for use with a vehicle such as a steering mechanism.

BACKGROUND

It is known to convert mechanical motion into changes in electrical properties. However, where mechanical motion in two directions being substantially opposite to one another is converted to electrical signals and used as control signals such as in the steering mechanisms of vehicles, only a single electrical property has previously been used to convert that motion into an electrical signal, which is unreliable and lacking in responsiveness.

SUMMARY

An embodiment of the invention extends to an interface for converting rotational motion to electrical signals comprising:
  a mechanical actuator which is rotationally moveable in a first direction and in a second direction;
  a first and a second electrical component connected to the actuator and arranged so that rotation of the actuator in the first direction causes changes in electrical properties of the first electrical component and rotation of the actuator in the second direction causes changes in electrical properties of the second electrical component;
  wherein the first and the second electrical components are connected to one or more electrical circuits so that rotation of the actuator in the first and the second directions causes changes in the one or more electrical circuits.

The actuator may be a shaft and the first and the second electrical components may be mounted on the shaft.

Rotation of the shaft may cause the changes in the electrical properties of the electrical components.

The first and the second electrical components may be free to rotate in a direction opposite to the direction of rotation causing a change in the electrical properties of the corresponding component.

The interface may further comprise means to encourage said first and said second electrical components to move in a direction opposite to a direction causing a change in the electrical properties of the corresponding electrical component.

The interface may further comprise one or more one-way clutches to connect the actuator with the first and the second electrical components.

The first and the second electrical components may be variable resistors.

Each variable resistor may comprise a contact and a resistor arranged so that the resistance of the variable resistor varies according to a position of said contact relative to said resistor and each variable resistor may be arranged so that one of said contact and said resistor is stationary with respect to the shaft and the other of the resistor and the contact moves when said shaft moves.

A further aspect of the invention extends to a steering mechanism incorporating an interface as herein described wherein said actuator is connected to a steering wheel.

The steering mechanism may further comprise a steering control system operable between a first extreme position, a neutral position and a second extreme position, each of the first and second extreme positions corresponding to a change in direction of travel, said neutral position corresponding to a constant direction of travel, wherein
  a change in direction of rotation of said actuator causes said steering control system to automatically alter its position from a position between one extreme position and the neutral position to a position between neutral and the other extreme position.

The steering mechanism may further comprise means for detecting an emergency situation wherein said steering control system is adapted to automatically cause said change in its position in response to an indication from said means for detecting an emergency.

A further aspect of the invention relates to a steering mechanism comprising a steering control system operable between a first extreme position, a neutral position and a second extreme position, each of the first and second extreme positions corresponding to an extreme change in direction of travel, said neutral position corresponding to a constant direction of travel, wherein
  a change in direction of rotation of said actuator causes said steering control system to automatically alter its position from a position between one extreme position and the neutral position to a position between neutral and the other extreme position.

A further aspect of the invention relates to a control mechanism for issuing a control command comprising a controller operable between a first extreme position, a neutral position and a second extreme position, each of the first and second extreme positions corresponding to a respective first and second control command, said first control command being an opposite of said second control command, positions of said controller between said extreme positions corresponding to control commands of varying degree, wherein said control mechanism is adapted to translate a change in the direction of movement of the controller into an automatic change from the first control command to the second control command or from the second control command to the first control command.

The first control command may be accelerate and the second control command may be brake.

The first control command may relate to the execution of a left-hand turn and the second control command may relate to the execution of a right-hand turn.

The neutral position may corresponding to no control command being issued.

The steering mechanism may further comprise means for detecting an emergency situation wherein said steering control system is adapted to automatically cause said change in its position in response to an indication from said means for detecting an emergency.

A further aspect of the invention extends to a vehicle incorporating a steering mechanism as herein described.

A further aspect of the invention extends to a method of converting rotational movement into an electrical signal, the method comprising:

altering an electrical property of a first electrical component in accordance with a first movement;
   altering an electrical property of a second electrical component in accordance with a second movement; wherein
   both of said first and said second movements are rotational movement and said second movement occurs in substantially the opposite direction to said first movement.

The method may further comprise providing a shaft upon which the first and the second electrical components are mounted, said shaft rotating to cause the alterations of the electrical properties of the first and second electrical components.

Each of the first and the second electrical components may be mounted on said shaft so that movement of the shaft in a first rotational direction causes the change in the property of the first component and movement of the shaft in the second direction causes the change in the property of the second component.

Each of the first and the second components may be freely rotateable about the shaft in a direction opposite to the direction causing the electrical property of the corresponding electrical component to change.

The electrical property of the first component may be the same as the electrical property of the second component.

The electrical property may be resistance.

BRIEF DESCRIPTION OF THE DRAWINGS

Example embodiments of the invention are hereinafter described with reference to the accompanying diagrams which are not to scale and where.

DESCRIPTION OF EXAMPLE EMBODIMENTS

Figure 1:
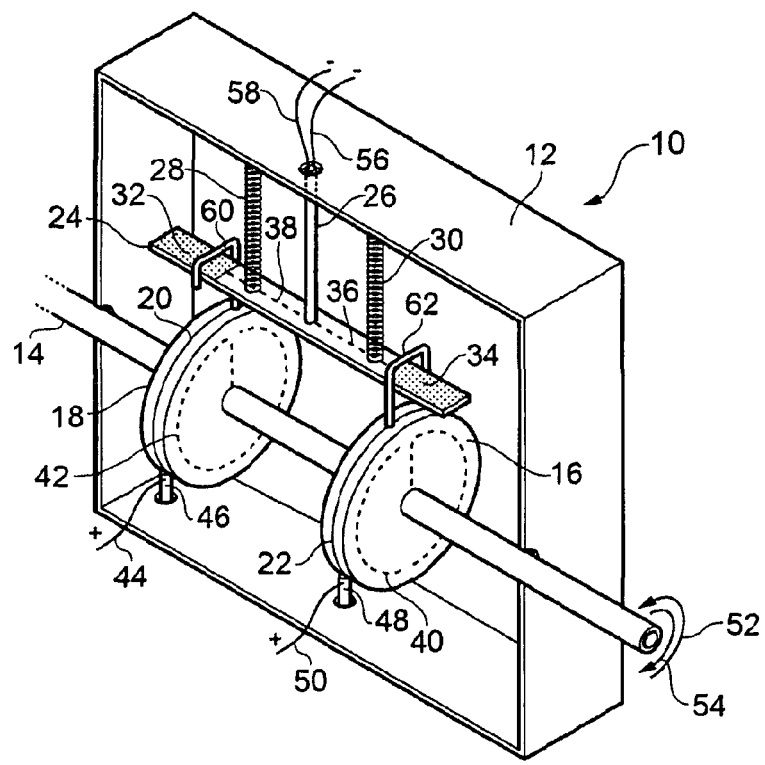
FIG. 1 is a perspective view of an interface according to a first embodiment of the invention.

FIG. 1 illustrates a perspective view of an interface 10 according to an embodiment of the invention. The interface 10 comprises a casing 12 which is shown in cut-away in FIG. 1. A hollow shaft 14 is mounted in the casing 12 and is able to rotate in a first direction designated by arrow 52 and in a second direction designated by arrow 54 and therefore provides an actuator for the interface 10. As illustrated, the direction of rotation 52 is opposite to direction of rotation 54.

There are two discs 16 and 18 mounted on the shaft 14. Each of the discs are mounted to the shaft 14 so that rotation of the shaft in one direction will cause movement of one of the discs, whereas rotation in the other direction will cause movement of the other disc. In this embodiment, this is achieved by one-way clutches. Therefore, disc 18 rotates along with the shaft when the shaft moves in direction of arrow 52, but is freely rotateable relative to the shaft in the direction of arrow 54. Similarly, disc 16 rotates along with the shaft when the shaft moves in direction of arrow 54, but is freely rotateable relative to the shaft in the direction of arrow 52.

Disc 16 further includes a conductor 22 situated along the circumference of the disc. A contact 48 is attached to the housing which, in turn, includes a lead 50. The contact 48 provides an electrical connection between lead 50 and conductor 22. As illustrated by a dashed line, disc 16 further comprises a spring 40. The spring 40 encourages the disc 16 back to the position illustrated in FIG. 1 after it has been rotated through action of the shaft 14.

Similarly, disc 18 includes conductor 20 in electrical contact with contact 46 attached to lead 44 and spring 42 biasing the movement of the disc 18. Spring 42 (shown by dashed line) encourages the disc 18 back to the position illustrated in FIG. 1 after it has been rotated through action of the shaft 14.

A contact bar 24 is mounted to the casing 12 by means of a suspension strut 26 and is mounted so that it may pivot and rotate relative to the casing 12. The contact bar 24 is connected to casing 12 by springs 28 and 30. Furthermore, the contact bar 24 includes two electrical contact areas 32 and 34 arranged near respective ends of the bar 24 at locations corresponding to the discs 16 and 18 as explained in greater detail below. A lead 36 is connected to contact area 32 and to a lead 58 disposed in suspension strut 26. Similarly, a lead 38 is connected to contact area 34 and to a lead 56, also disposed in suspension strut 26. Both leads 36 and 38 are embedded in the contact bar 24 and are therefore depicted by dashed lines in FIG. 1.

Disc 18 further comprises a hook 60 which rotates together with the disc 18 under the action of the shaft 14 or the spring 42. The hook 60 is arranged to engage with the contact area 32 of conducting bar 24 when the disc 18 rotates in a counter-clockwise direction past the position illustrated in FIG. 1. In a similar manner, disc 16 includes a hook 62 arranged to rotate along with the disc 16 and to engage with the contact area 34 of contact bar 24 when disc 16 rotates in a clockwise direction past the position illustrated in FIG. 1.

Figure 2:
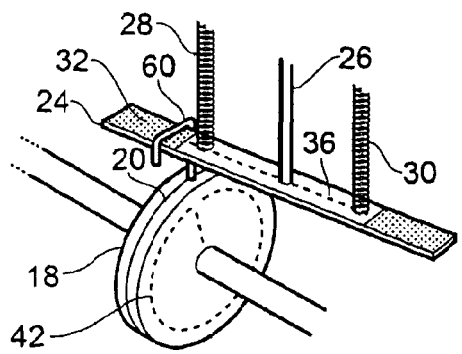
FIG. 2 is a perspective view of a portion of the interface of FIG. 1 illustrating displacement of a contact bar of the interface during operation.
Figure 3:
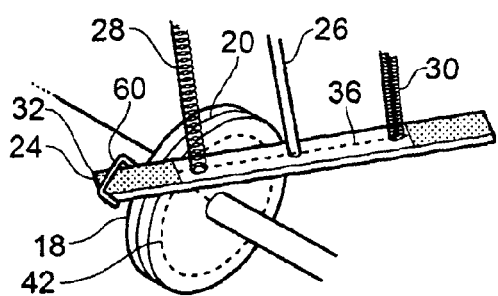
FIG. 3 is a perspective view of the portion of the interface of FIG. 1 illustrated in FIG. 2 illustrating further displacement of the bar during operation.

The operation of the interface 10 will now be described with reference to FIGS. 1, 2 and 3. When the shaft 14 rotates in the direction of arrow 52, the shaft engages with the disc 18 by means of the one-way clutch arranged between them (not shown in the drawing) causing the disc 18 to rotate in the same direction. This, in turn, causes the hook 60 to rotate along with the disc 18. As the hook 60 moves it engages with connecting bar 24, encouraging the portion of the bar 24 downwards towards disc 18, as shown in FIG. 2. The disc 18 will continue to rotate thereby bringing contact area 32 of the contact bar 24 into contact with the connector 20 on disc 18, as illustrated in FIG. 3.

When the contact area 32 is thereby placed into contact with the connector 20, a closed circuit is formed between lead 58, lead 38, contact area 32, connector 20, contact 46 and lead 44. Furthermore, the resistance of connector 20 is predetermined so that this connector acts as a variable resistor; the resistance will depend on the position along its length where the electrical contacts are made. As the disc 18 continues to rotate the length of connector 20 between the connecting bar 24 and contact 46 decreases, thereby decreasing the resistance of the sub-circuit of which connector 20 forms a part. In this manner, rotation of the shaft 14 in the direction of arrow 52 causes a change in the resistance of an electrical component (the sub-circuit comprising connector 20).

In a similar manner, rotation of the shaft 14 in the direction of arrow 54 causes a change in the resistance of connector 22 on disc 16.

When disc 18, for example, rotates, the arrangement of hook 60, bar 24, hook 62, springs 28 and 30 and strut 26 is such that disc 16 will be rotated in the same direction by action of the bar 24. Therefore, when the shaft 14 rotates in the opposite direction, the bar 34 will be quickly brought into contact with contact 22.

When the shaft 14 rotates in the direction of arrow 54, spring 42 influences the motion of disc 18 as the engagement between shaft 14 and disc 18 is not operational when the disc rotates in this direction. Therefore, the action of the wind-up spring 42 joining disc 18 to shaft 14 will encourage the disc back to its neutral position (i.e. the position shown in FIG. 1).

When the shaft 14 rotates in the direction of arrow 52, disc 16 is free to move relative to the shaft and, in this situation, the movement of disc 16 is influenced by the wind-up spring 40 which encourages the disc 16 back to the neutral position (i.e. the position shown in FIG. 1) when the shaft 14 disengages from disc 16.

The connecting bar 24 is attached to the casing 12 by springs 28 and 30 located near respective ends of the bar 24. These springs 28 and 30 encourage the bar back to the neutral position (the position illustrated in FIG. 1). During operation of the interface 10, the springs 28 and 30 help to stabilise the interface 10 and limit the motion of the discs 16 and 18.

Electrical leads 44 and 50, and 56 and 58 may be connected to other electrical components and form part of a larger circuit. Advantages of embodiments of the invention are set out with reference to a steering control system in a vehicle, but it is to be realised that further embodiments of the invention are applicable to any situation where it is desirable to have rotation in either direction positively affect an electrical property.

When the interface 10 is installed as part of a steering mechanism, the shaft 14 is provided with a steering control such as a steering wheel (not shown). The leads 44, 50, 56 and 58 are then connected to a circuit which controls the direction of travel of a vehicle. Where, for example, the steering mechanism is installed in an automobile, the steering mechanism may control the angle of the front wheels of the automobile relative to a surface on which the wheels progress as well as controlling the speed at which the wheels pivot to achieve that angle.

Advantageously, the interface of embodiments of this invention is able to convert a positive change to an electrical property (the resistance in the embodiment of FIG. 1) into activation of the steering wheel in either direction. Therefore, specifically in the case of steering which is electrically controlled, the amount of control and responsiveness of the steering mechanism is improved over known systems. Furthermore, embodiments of the invention, when applied to steering and elsewhere have the advantage that movement in the opposite direction of the actuator can be immediately translated into a fundamental change in direction. For example, a right-hand turn could be immediately converted into a left-hand turn when the actuator is moved in the opposite direction. Therefore, it is not necessary for the user to expend any force or time in returning the steering wheel back to the neutral position; a change in direction of rotation of the steering wheel can be immediately translated into a signal to significantly change the direction of the vehicle.

It is to be realised that the aforementioned embodiments of the invention have an advantage over known systems where it is necessary for the steering wheel (or other mechanism used to control the direction of travel) must first return to the neutral position before the direction of travel can undergo a fundamental change (i.e. from a left-hand turn to a right-hand turn, for example).

Therefore, further embodiments of the invention relate to a known steering mechanism such as a steer-by-wire system where the direction of travel is electronically controlled. The steering mechanism in this case generally comprises a control such a steering wheel which has to return to a neutral position before the change in direction can be fundamentally altered. In such embodiments, a known steering mechanism is combined with an emergency situation detector which may, for example, measure the deceleration of the vehicle or the force with which the steering wheel has been turned. The steering mechanism according to such an embodiment would operate in two modes: a normal mode in which turning the steering wheel in the opposite direction will first return the steering mechanism to the neutral position and an emergency mode where turning the steering wheel in the opposite direction will automatically cause the steering mechanism to cause turning of the vehicle in the opposite direction.

It is to be realised that, in an emergency situation, a user will exert significant force in turning the steering wheel, which will be translated to the shaft 14 of the embodiment of FIG. 1. This force will be sufficient to overcome the force exerted by the spring 40 or 42 opposing that direction of rotation. Furthermore, the placement of the bar 24 when the discs 16 or 18 rotate is such that the rotation in the opposite direction will cause the bar to quickly engage with the contact (20 or 22) corresponding to the shift in direction of rotation of the shaft. In such circumstances it is not necessary for the user to actively return the steering wheel to the neutral position. Instead, the shaft 14 is returned to the neutral position through action of the springs 40 and 42. A force in the opposite direction need only be applied in an emergency situation.

Furthermore, in an alternative embodiment, the shaft 14 of FIG. 1 could be arranged to active disc 18 (for example) only if a steering wheel connected to the shaft 14 is activated with significant force. In this instance, the sub-circuit corresponding to disc 18 could be used to control a braking system. It is to be realised that further embodiments of the invention are applicable to any control systems where a positive change to an electrical property in response to movement in each of two opposing directions are desirable. For example, to control the acceleration and braking of a vehicle, an embodiment of the invention may be arranged to convert linear backwards and forwards motion into acceleration and braking by connection to appropriate acceleration and braking systems which is to be marketed under the trade name "Relative Acceleration and Braking System (RABS) Technology".

Figure 4:
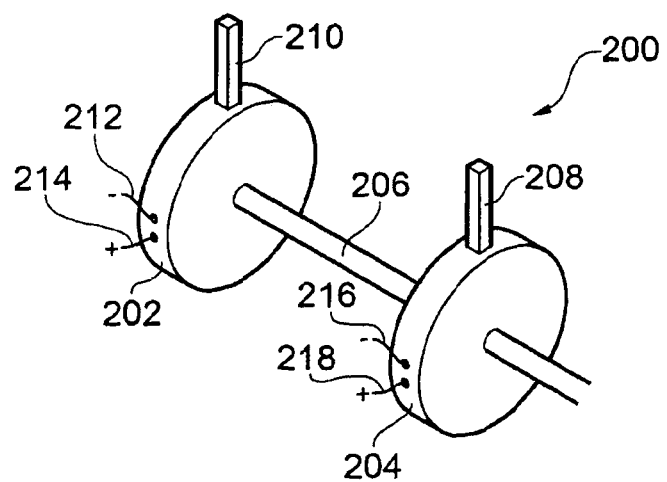
FIG. 4 is a perspective view of an interface according to a further embodiment of the invention.

FIG. 4 is a perspective view of an interface 200 according to a further embodiment of the invention. Interface 200 includes a shaft 206 to which two rotationally variable resistors 202 and 204 are connected. The connection between the rotationally variable resistors and the shaft 206 are such that rotation of the shaft in one direction causes an increase in the resistance of resistor 202 whereas rotation of the shaft in the other direction causes an increase in the resistance of resistor 204.

Furthermore, resistor 202 is provided with leads 212 and 214 whereby it is connected to a electrical circuit. Resistor 202 is further connected to a casing (not shown) by strut 210. Strut 210 acts to anchor the variable resistor to prevent movement of the resistor relative to the shaft 206. Similarly, resistor 204 is provided with leads 216 and 218 with which it is connected to an electrical circuit and strut 208 which anchors the resistor relative to movement of the shaft 206.

FIG. 4 illustrates an embodiment of the invention which may be implemented using two known variable resistors, provided that the two resistors are configured to increase their resistances with corresponding opposite rotation of the shaft 206.

Embodiments such as that illustrated in FIG. 4 provide a relatively cheap and simple manner of implementing aspects of the invention, but does not provide the responsiveness or flexibility of the embodiment illustrated in FIG. 1.

Figure 5:
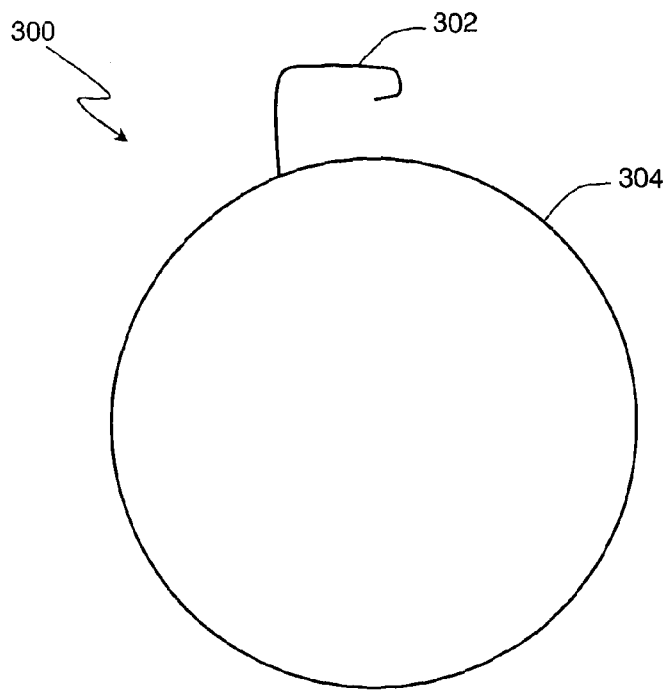
FIG. 5 is a schematic illustration of an alternative arrangement of a disc and hook for use with embodiments of the invention.
Figure 6:
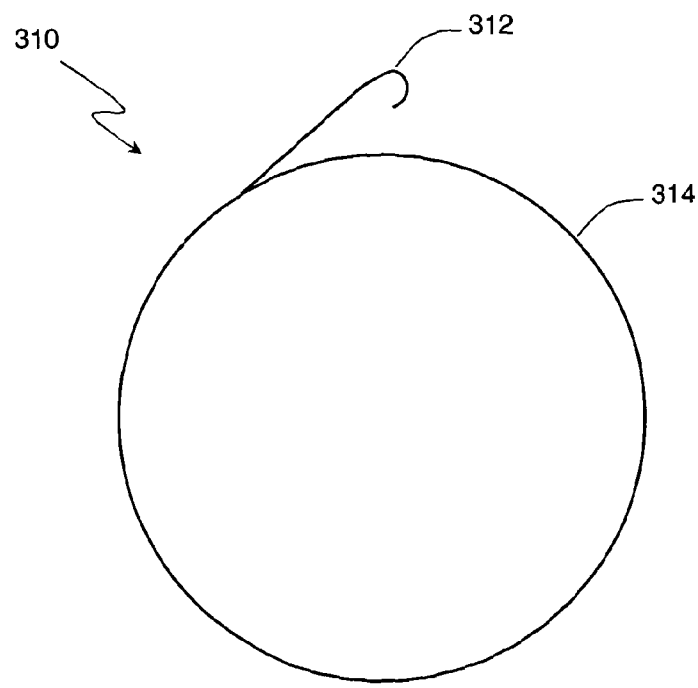
FIG. 6 is a schematic illustration of an alternative arrangement of a disc and hook for use with embodiments of the invention.

FIG. 5 is a schematic illustration of an alternative arrangement 300 of a disc 304 and hook for use with embodiments of the invention. Similarly, FIG. 6 is a schematic illustration of an alternative arrangement 310 of a disc 314 and hook 312 for use with embodiments of the invention. Both the arrangements illustrated in FIGS. 5 and 6 help to ensure that the bar 24 (with reference to the arrangement of FIGS. 1 to 3) is engaged with the respective hooks 302 and 312 and so arranged that when the shaft is rotated in the opposite direction, the contact on the other disc is brought into contact with the bar, thereby ensuring that the direction of travel can be quickly and fundamentally changed.

Embodiments of the invention have been illustrated and described where resistance is the electrical property which changes with rotational (or other) movement. However, it is to be realised that the invention is not limited in this respect. Other electrical properties such as inductance or capacitance may be used instead and suitable circuits provided to implement such embodiments.

Furthermore, in the embodiments illustrated a shaft rotates relative to a casing to provide the necessary movement. In an alternative embodiment however, the casing rotates relative to a fixed shaft (or other member) and the steering wheel or other control mechanism is then connected to the casing.

In further embodiments, interfaces may convert movement in more than two directions into electrical signals. In such embodiments, there may be an electrical component corresponding to each direction of movement.

The invention claimed is:

1. A steering mechanism having an interface for converting rotational motion to electrical signals, the interface comprising:
    a shaft which is rotationally moveable in a first direction and in a second direction;
    a first and a second electrical component mounted on the shaft and arranged so that rotation of the shaft in the first direction causes changes in electrical properties of the first electrical component and rotation of the shaft in the second direction causes changes in electrical properties of the second electrical component;
    the first and the second electrical components being connected to one or more electrical circuits so that rotation of the shaft in the first and the second directions causes changes in the one or more electrical circuits; and
    the first and the second electrical components are free to rotate with respect to the shaft in a direction opposite to the direction of rotation causing a change in the electrical properties of the corresponding component.

2. The interface according to claim 1 further comprising:
    means to encourage said first and said second electrical components to move in a direction opposite to a direction causing a change in the electrical properties of the corresponding electrical component.

3. The interface according to claim 1 further comprising:
    one or more one-way clutches to connect the actuator with the first and said second electrical components.

4. The interface according to claim 1, wherein the first and the second electrical components are variable resistors.

5. The interface according to claim 4, wherein each variable resistor comprises a contact and a resistor arranged so that the resistance of the variable resistor varies according to a position of said contact relative to said resistor and wherein each variable resistor is arranged so that one of said contact and said resistor is stationary with respect to the shaft and the other of the resistor and the contact moves when said shaft moves.

6. A steering mechanism having an interface for converting rotational motion to electrical signals, the interface comprising:
    a shaft which is rotationally moveable in a first direction and in a second direction;
    a first and a second electrical component mounted on the shaft and arranged so that rotation of the shaft in the first direction causes changes in electrical properties of the first electrical component and rotation of the shaft in the second direction causes changes in electrical properties of the second electrical component;
    the first and the second electrical components being connected to one or more electrical circuits so that rotation of the shaft in the first and the second directions causes changes in the one or more electrical circuits;
    the first and the second electrical components are free to rotate with respect to the shaft in a direction opposite to the direction of rotation causing a change in the electrical properties of the corresponding component; and
    said actuator is connected to a steering wheel.

7. The steering mechanism according to claim 6 further comprising:
    a steering control system configured to operate between a first extreme position, a neutral position and a second extreme position, each of the first and second extreme positions corresponding to an extreme change in direction of travel, said neutral position corresponding to a constant direction of travel, wherein
    a change in direction of rotation of said actuator causes said steering control system to automatically alter its position from a position between one extreme position and the neutral position to a position between neutral and the other extreme position.

8. The steering mechanism according to claim 7 further comprising:
    means for detecting an emergency situation wherein said steering control system is adapted to automatically cause said change in its position in response to an indication from said means for detecting an emergency.

9. A method of converting rotational movement of a steering mechanism into an electrical signal, the method comprising:
  providing a shaft upon which a first and a second electrical component are mounted, such that rotation of the shaft in a first direction alters an electrical property of the first electrical component, and rotation of the shaft in a second direction opposite the first direction alters an electrical property of the second electrical component; and
  each of the first and second components is freely rotatable about the shaft in a direction opposite to the direction causing the electrical property of the corresponding electrical component to change.

10. The method according to claim 9, wherein the electrical property of the first component is the same as the electrical property of the second component.

11. The method according to claim 9, wherein the electrical property is resistance.

* * * * *